United States Patent Office 2,925,933
Patented Feb. 23, 1960

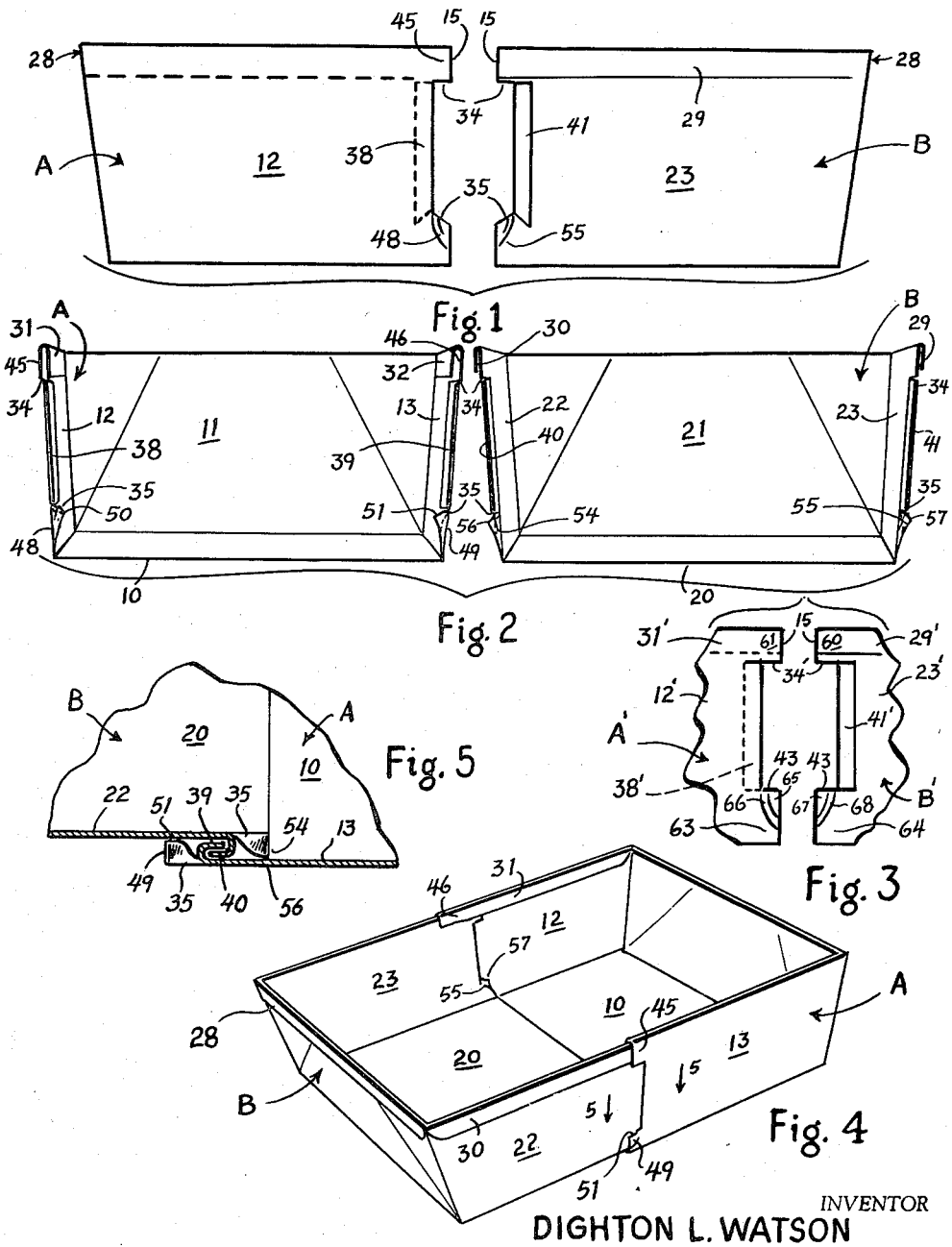

2,925,933

MERCHANDIZABLE EXPANSIBLE METAL FOIL BAKING CONTAINER

Dighton L. Watson and Forest K. Michaelson, Minneapolis, Minn.

Application February 2, 1956, Serial No. 562,989

3 Claims. (Cl. 220—8)

This invention is a continuation in part of our patent application, Serial No. 475,764, filed December 16, 1954, and relates to a modification thereof and improvement thereover. More particularly, this disclosure embodies disposable and reuseable merchandisable expandable metal foil baking and cooking cartons for packaging relatively fluid doughs, batters and other food stuffs of a like character or fish sticks, meats and the like which are ordinarily cooked in a thin film of fluid grease over the bottom of the warming and cooking container.

As heretofore explained in the above mentioned application and our continuation in part, application Serial No. 563,113, filed February 2, 1956, for Expandable Metal Foil Baking Cartons and Method of Production filed concurrently herewith, the problem of the expense in packaging and saving of space is an ever present one, both with the manufacturer and the storekeeper. In the arrangements as provided for in the above mentioned applications, relatively fluid doughs and batters may be retained by reason of the expansible part interfitting relationship of the inner half carton side with the outer half carton side and the compressive force of the contents of the carton thereagainst. However, it is found that very watery dough substances and the like have a tendency to lose liquid material unless properly handled in the kitchen, preparatory to baking or cooking in the carton in its expanded condition.

Accordingly, it is an object of this improvement in expansible metal foil baking and cooking merchandisable cartons and containers to provide the same with innerlocking and inner-engaging edges which permit more of fluid batters and doughs being retained in the container without loss of moisture when in the expanded condition, as in a kitchen preparatory to baking or cooking the contents thereof therein.

Another object of this improvement is to provide for the manufacture of expansible merchandisable baking and cooking containers made from metal foils and which retain the fluid therein of very moist batters when packaged for freezing and subsequently thawed in an expanded baking or cooking relationship.

It is another object of this improvement to provide an expansible merchandisable cooking container made from metal foils which in an expanded relationship retain a layer and coating of cooking grease at the bottom thereof without loss through leakage therefrom during cooking or baking.

Further objects and advantages will be apparent from the following description of the accompanying drawings, wherein:

Figure 1 is a side plan view of the two carton sections showing the prefabrication of the open carton sides prior to assembly.

Figure 2 is a plan view of open carton sides having prefabricated edges as illustrated in Figure 1.

Figure 3 is a partial view illustrating a modification of the carton sides shown in Figure 1.

Figure 4 is a perspective of the half carton sections shown in Figures 1 and 2 and joined in overlapping relationship.

Figure 5 is a view taken on line 5—5 of Figure 4.

In the following description like parts in the respective figures will be similarly indicated.

As explained in our previous parent application and co-pending application filed herewith, each of the half carton sections are the same size to effect a sealing action between the sides and bottom portions in both the unexpanded and expanded positions of the half carton sections.

In order to simplify and expedite the modification and improvement as disclosed herein, each of the half carton sections A and B are formed from blanks or the cutting of a prefabricated pan into two half carton sections of the same size and dimensions as described in the above mentioned applications. For example, by cutting a prefabricated aluminum foil carton, pan or container, of generally rectangular configuration, there is provided the half carton section A having a bottom 10, back closure wall 11, side walls 12 and 13, and an open side as defined by the line of cut 15. The other half of the pan, or carton which has been cut, and indicated as section B, is similarly provided with a bottom panel 20, back wall 21, side walls 22 and 23, and an open side which is defined by the same cut line 15, as previously described for the half carton section A.

In prefabricating an aluminum foil pan, the open top edge of the pan is usually provided with a rim flange 28, extending entirely thereabout and turned outwardly and downwardly about the circumference of the pan edge to strengthen and reinforce the foil forming this edge.

In order to change this arrangement and provide for interlocking tongues and guide grooves, the side rims 28 on the box section B are retained as outer folded flanges 29 and 30 on each wall section 23 and 22, respectively, and as illustrated in Figures 1, 2 and 4. These outer folded flanges, as an integral portion of wall sections 23 and 22 form tongues which fit into cooperative guide grooves on the other half pan section A, as hereinafter described.

The rim 28 on the other half baking pan and carton section A, is retained in turned back and down relationship relative to back wall 11 and at the sides, relative to side walls 12 and 13, is lifted and turned inwardly and downwardly as flanges 31 and 32 to provide guide grooves for the tongues 29 and 30 respectively.

In order to form one innerlocking seal, of the character herein described, which prevents leaking of moisture from very fluid doughs and batters and ready pulling apart of the half pan and carton sections, each of the walls 12, 13 and 22, 23 at their open ends formed by the cut line 15, are prefabricated by hand or suitable machines. For example, as illustrated in Figure 2 and Figure 3, the cut line 15 represents a line of cut made to divide a prefabricated aluminum foil pan or blank forms into half pan sections, as described. In the representative examples, illllustrated in the Figures 1, 2 and 4 there is provided in each of the sides 12, 13 and 22, 23, cut lines 34 of one-eighth inch in depth, just below and parallel to the lower edges of the flanges 29, 30 and 31, 32 in the side walls 22, 23 and 12, 13, respectively. In the lower portion of walls 22, 23 and 12, 13, and in spaced relationship to the cut lines 34, there is provided angular cut lines 35 extending inwardly of the walls for a depth of one-eighth inch. The cut lines in each of the walls, as described, are relatively exactly alike and in similar matching relationship, and therefore similarly indicated to provide like pairs of inwardly folding flanges 38 or 39 on walls 12 and 13, respectively, and outwardly folding flanges 40 and 41, on walls 22 and 23, respectively.

In the modification illustrated in Figure 3 showing only partial sections of sides 12 and 23, the cut lines 34 for each of the wall sections 12, 13 and 22, 23 are fabricated in the manner as herein described and the cut lines 43 are relatively and correspondingly alike and extend in parallel relationship thereto, to the same depth and on an angle perpendicular to the cut line 15. In this respect the cut lines 43 differ from the angular cut lines 35 and produce, with cut lines 34, straight upper and lower edges for the turned in flange 38′ and the turned out flange 41′.

Each of the flanges such as 38′ on section A′, and such as 41′ on section B′ is pressed or folded back in a manner to space the ends of the flanges slightly away from the integral wall sections from which the flanges are formed. Thus, for example, when the baking pan or carton section B′ is mounted to slide in baking pan or carton section A′ to the position corresponding to that shown in Figure 4, these flange elements are in opposed relationship and adapted to engage in innerlocking engagement. The flanges 38′ and 41′ interlock in the same manner as the flanges 39 and 40. As illustrated, the wall 22 with its outwardly and rearwardly turned flange 40 and wall 13 with its inwardly and rearwardly turned flange 39, engage in overlapping and interlocking relationship when the baking pan or carton sections A and B are in expanded position as representatively illustrated in Figure 5.

Each of the sides 12, 13 and 22, 23 of the carton sections A and B, respectively, when cut along the similar cut lines 34 and similar angular cut lines 35, to provide the reversely turned back flanges 38 and 41, have remaining, forwardly projecting wall portions extending in spaced relationship. That is the cut 34, made in each of the walls 12 and 13, provides upper integral corner extensions 45 and 46, which with overturned flanges 32 and 31, respectively, provide reinforcing extensions of the guide grooves formed therebetween. The portions of the side walls beneath the angularly cut lines 35, as described, provide the extensions 48 and 49 of box section A with inclined upper edges 50 and 51, respectively. The portions of the side walls adjoining the inclined edges 50 and 51 are pressed inwardly from the planes of the walls 12 and 13, respectively, to extend a distance inwardly therefrom slightly greater than the edges of the turned in flanges 38 and 39. This inward pressing also bends or pushes the vertical edge and body portions of the extensions 48 and 49, substantially throughout their lengths gradually inwardly in an upward direction from the points of their integral connection with the partial container side walls 12 and 13 and connecting base 10.

Likewise, in a reverse relationship, the extensions 54 and 55, of pan section B, which are beneath the cut lines 35, as described, are pressed outwardly to form angular portions 56 and 57 which extend from the walls 22 and 23, respectively, a distance slightly more than the distance between the walls and the edges of the turned out flanges 40 and 41. This outward pressing also bends or pushes the vertical edge and body portions of the extensions 54 and 55 substantially throughout their length gradually outwardly in an upwardly extending direction substantially throughout their vertical heights. Thus, the extensions 54 and 55 are bent outwardly, and the extensions 48 and 49 are bent inwardly, as illustrated in Figure 5.

As shown in Figure 4 in conjunction with Figure 5, the end of the foil pan section A, with its inwardly turned flanges 38 and 39, is telescoped over foil pan section B with its outwardly turned flanges 41 and 40 sliding against the inner surface of pan section A. Flanges 29 and 30 of pan section B slip into the guide grooves formed by flanges 31 and 32 and the extended ends 45 and 46, and ride in overlapping and reinforcing relationship relative to the section A for a distance of about three-eighths inch when the cuts 34 and 35, as described, are about one-eighth inch in depth. With pan sections A and B fitted together the lower extensions 48, 49 and 54, 55, press in relatively fluid tight relationship against the side walls of the opposite section.

In Figure 5 is illustrated the manner in which the bottoms 10 and 20 with side walls 13, 22 and 12, 23, are engaged in a fluid tight relationship. As illustratively shown, the bent in end and edge 51 of extension 49, on the outer wall 13, presses inwardly against the outer surface of wall 22 and the outwardly bent edge 56 and body portion of extension 54, on the inner wall 22, presses outwardly against the inner surface of wall 13. The opposite side extensions 48 and 57 of the telescoping pan sides (not shown in detail) likewise engage against the relative walls 23 and 12, respectively.

With lower ends of the inwardly turned flanges 38 and 39, and outwardly turned flanges 40 and 41 cut on an angle by cut lines 35, as described, the bends in extensions 48, 49 and 54, 55, respectively, provide sinuous paths which cooperate with the interlocking flanges 38, 41 and 39, 40, respectively, to retain very fluid batters and doughs in the pan sections in telescoped and expanded relationship. Each pan section being of the same relative size affords a tight interfitting relationship which aids in the fluid tight juncture of the pan sections, as described. With the flanges 48, 49 and 54, 55 extending at a vertical heighth of three-eighths inch and a top guide and bottom overlap of three-eighths inch the pan in expanded stationary position on a level surface will hold water at a depth of three-eighths inch. Fluid batters and dough materials which fill the expanded pan do not run out or escape the overlapping ends.

The provision of the cuts 34 and 35 to provide inturned and outturned flange depths of one-eighth inch, as described, to produce a three-eighths inch overlap is the preferred embodiment for general dough and batter usage. However, when relatively light or relatively heavy substances are to be packaged the overlap of the guides, pan sides and bottoms may vary from three thirty seconds to three fourths inches by forming the inturned and outturned interlocking flanges with a depth of from one thirty second to one-quarter inch. This depth is measured primarily by the relative depth of the cuts 34, 35 and 43, as described.

With regard to the modification shown in Figure 3, the cut 43 is made in each of the side walls 12′ and 23′, on a plane parallel to the cut 34′ as described, which provides straight end edges for the inturned flange 38′ and the outturned flanges 41′. The straight ends on the flanges 38′ and 41′ are satisfactory for many purposes. However, with the more fluid and liquid batters and doughs the inclined angular cuts providing sinuous paths between the overlapping flanges, extensions and sidewalls are preferred. The angular lower ends of the flanges 38 and 41 provide a very slight spacing from the adjacent cooperative outside wall which affords a temperature differential between a cold frozen liquid or batter and the heated side walls to effect a baking operation and positively seal any open spaces between the overlaps.

Upon folding back the flanges 38′ and 41′, as described, the flanges 29′ and 31′ with corresponding integral wall portions form the extended tongue 60 and guide groove 61, which engage in the interlocking relationship of the half carton sections, in the manner as described. The cut lines 43 provide walls 12′ and 23′ with upright extensions 63 and 64 as integral portions of side walls 12′ and 23′. The upper corner portion 65 of extension 63 is kinked or bent in along a relative fold or curved line 66 to extend substantially flush or inwardly a slightly greater distance than the inner edge of flange 38′. The upper corner portion 67 of extension 64 is pressed or kinked outwardly along fold line 68 to extend substantially flush or outwardly a slightly greater distance than the outer edge of flange 41′. Thus when the carton sections A′ and B′ are joined in the manner as illustrated and described with reference to Figures 4 and 5, each of the relative side flanges, tongue and guide grooves and upright extensions are in an interfitting relationship. For example, on one side, the wall 23' will telescope within wall 12' with the tongue formed by flange 29' and wall 23' sliding within the guide groove formed by flange 31' and wall 12', pressed in corner portion and vertical edge of extension 63 engages the outer surface of wall 23', and pressed out corner portions 67 and vertical edge of extensions 64 engages the inner surface of wall 12'. The opposite side walls (not shown) being similar will be joined in a corresponding and relative relationship in the manner as illustrated with reference to Figure 4.

As heretofore indicated the vertical height of extensions 48, 49 and 54, 55 may be varied as may the height of the type extension 63 and 64. Likewise the depth of the cuts 34, 35 and 43 may be varied to change the overlap of the telescoping pan sides and bottom from three-thirty seconds to about three-fourths inch or more, if desired. However from the standpoint of allowing for utilizing the greatest amount of the space saving value the overlap is preferably not greater than three-fourths inch. By raising the height of the extension as 48, 49 and 54, 55 in the illustrative example, to one-half inch and placing the expanded pan on a level surface it will hold up to one-half inch of liquid without leakage. However, for practical application, in handling and manipulating a pan containing very fluid and liquid batters, a three-eighth inch overlap, as described, with approximately a three-eighth inch vertical height in the lower outwardly and inwardly pressed extensions affords a merchandisable, expansible baking and cooking pan made of dispensable metal foil of a thickness of about .0026 inch. Other dispensable metal foil containers of the character herein described, may be utilized when made of foil thicknesses, within the critical range of .003 inch to .0059 inch if properly prefabricated and assembled relative to the weight and contents of the packaged goods to be dispensed, expanded and baked, cooked or warmed therein. In the usual packaging for commercial sale the fluid doughs and batters are frozen and packaged or packaged and immediately frozen in the expansible metal foil containers herein described.

In accordance with the patent statutes, we have described the principles of construction and operation of our expansible metal foil containers for baking and cooking liquid doughs and batters, and while we have endeavored to set forth the best embodiment thereof, we desire to have it understood that changes may be made within the scope of the following claims without departing from the spirit of our invention.

We claim:
1. An expansible and disposable metal foil container for merchandising fluid doughs and batters comprising a pair of telescoping half carton sections formed of metal foil of sufficient thickness to be self-sustaining and yet be flexible, each carton section having a bottom portion, side walls extending upwardly from opposite edges of said bottom portion, and an end wall connected to said side walls and bottom portion, the other end of each section being open to form an open end, portions of said side walls intermediate the top and bottom edges being folded toward the end walls thereof, the folded portions on one section being folded outwardly to form flanges overlying the outer side wall surface, the folded portions of the other section being folded inwardly to provide flanges overlying the inner side wall surface of said other section, said flanges of each section engaging the side walls of the other section in telescoped relation of said sections, the portions of said side walls above and below said flanges projecting beyond the flanges to provide overlapping guide portions for the telescoped sections, elongated flanges on the upper edges of a first of said sections folded to provide a channel groove accommodating the upper edge of the second section, the projecting portions of said side walls beneath said first-named flanges on said one section being bent outwardly into surface contact with the side walls of said other section.

2. The structure of claim 1 and in which the projecting portions of the side walls beneath said first named flanges on said other section are bent inwardly into surface contact with the side walls of said one section.

3. The structure of claim 1 and including elongated flanges along the upper edges of the side walls of the second of said sections folded into surface contact with the side walls to which they are secured and slidable in the channel groove of the first section.

References Cited in the file of this patent
UNITED STATES PATENTS

| | | |
|---|---|---|
| 709,150 | Halls | Sept. 16, 1902 |
| 876,235 | Quackenboss | Jan. 7, 1908 |
| 1,816,399 | Rohwedder | July 28, 1931 |
| 1,858,179 | Bay | May 10, 1932 |
| 2,361,984 | Williamson | Nov. 7, 1944 |
| 2,556,568 | Aikman | June 12, 1951 |
| 2,627,801 | Danziger | Feb. 10, 1953 |
| 2,673,003 | Stewart | Mar. 23, 1954 |
| 2,683,953 | Hopkins | July 20, 1954 |

FOREIGN PATENTS

| | | |
|---|---|---|
| 842,994 | France | Mar. 13, 1939 |